March 8, 1927.
H. H. EARLY
1,620,450
CHANGEABLE SIGN
Filed Jan. 20, 1926
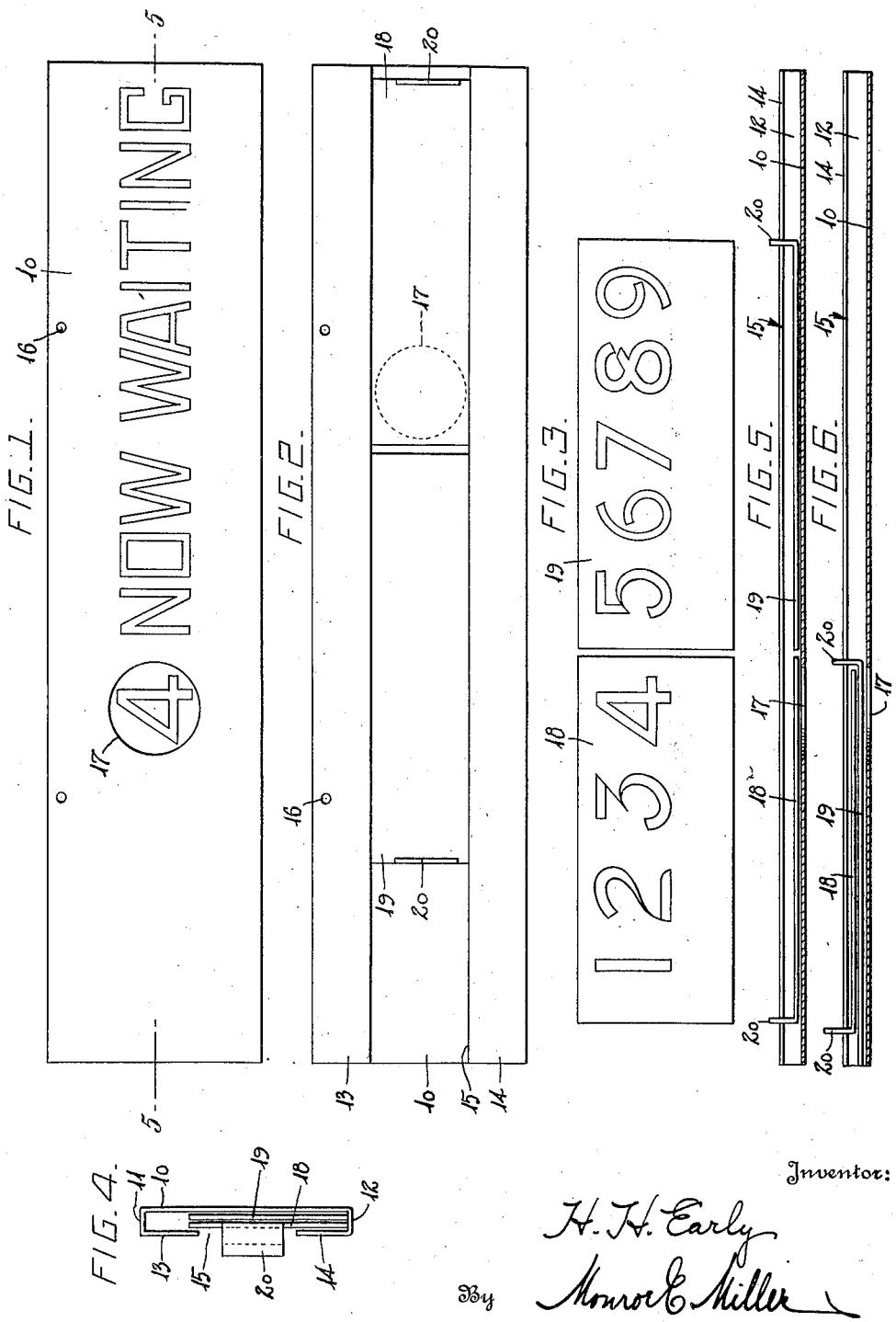
Inventor:
H. H. Early
By Monroe E. Miller
Attorney.

Patented Mar. 8, 1927.

1,620,450

UNITED STATES PATENT OFFICE.

HARRY H. EARLY, OF OSHKOSH, WISCONSIN.

CHANGEABLE SIGN.

Application filed January 20, 1926. Serial No. 82,513.

The present invention relates to changeable signs, and aims to provide a novel and improved device of that kind for exhibiting different numbers or other characters selectively.

The present sign is intended especially for use in barber shops for indicating to persons passing by and those contemplating entering, the number of patrons that are waiting, although the device may be used for other purposes for which it is suited.

A further object of the invention is the provision of a changeable sign comprising slides containing the numbers or characters and a holder or guide for the slides having an opening or window to expose the numbers or characters one at a time, and the arrangement being such that either slide may have its numbers or characters exposed through said window, using a holder or guide of relatively short length without the necessity for the slides projecting from said holder or guide, to provide a simple and compact structure.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein—

Figure 1 is a front view of the improved sign.

Fig. 2 is a rear view thereof.

Fig. 3 is a front view of the two slides.

Fig. 4 is an end view of the device.

Fig. 5 is a longitudinal section on the line 5—5 of Fig. 1.

Fig. 6 is a longitudinal section corresponding with Fig. 5 showing another arrangement of the slides.

The device is composed of three simple parts which may be readily formed from suitable sheet metal, and which may be suitably finished.

The slide holder or guide is composed of a plate having its upper and lower edge portions bent back, and said holder or guide has the front wall 10, top 11, bottom 12, and back flanges 13 and 14 depending and upstanding from the top 11 and bottom 12, respectively. The flanges 13 and 14 constitute the back of the holder having a longitudinal slot 15 between said flanges. The front wall 10 and upper flange 13 have apertures 16 near the top 11 for the engagement of screws, nails, hooks or other elements for supporting the device at some suitable point, such as in a show window or on the door of a barber shop with the front of the device exposed to the sidewalk or street. The front wall 10 has an opening or window 17 between its ends, followed by the words "Now waiting", to indicate the number of patrons waiting when a number is exposed through said opening or window 17.

Two slides or plates 18 and 19 are slidable longitudinally in the holder or guide, the slide 18 containing the numbers 1, 2, 3 and 4, while the slide 19 contains the numbers 5, 6, 7, 8 and 9. The holder is sufficiently wide, as seen in Figs. 4, 5 and 6 to enable the slides 18 and 19 to overlap one another, with either slide in front of the other, and said slides are provided at their opposite ends with rearwardly extending flanges 20 providing finger pieces by means of which the slides may be readily moved in the holder.

The numbers or characters on either slide may be exposed through the opening or window 17 to indicate the number of patrons waiting, and by using the two slides it is possible to expose the numbers without the necessity for the slides projecting from the holder or guide which would be the case if the slides were integral. To expose the numbers 1, 2, 3 and 4, the slide 18 is moved behind the front wall 10, and the slide 19 may be shifted rearwardly so that the slide 18 moves between the slide 19 and front wall 10. To expose the numbers on the slide 19, the slide 18 is shifted rearwardly so that the slide 19 may move between the slide 18 and front wall 10, as seen in Fig. 6.

Having thus described the invention, what is claimed as new is:—

1. A changeable sign comprising a holder, and two slides movable longitudinally therein and each of shorter length than the holder to enable the adjacent ends of the slides to be moved past one another without withdrawing the slides from the holder, the slides having characters on the same sides thereof and being shiftable in the holder to enable either slide to overlap the side of the other slide having the characters, and the holder having an opening to expose one character of either slide.

2. A changeable sign comprising a holder having front and back walls, and two slides movable longitudinally in the holder and each of shorter length than the holder to enable the adjacent ends of the slides to be moved past one another without withdrawing the slides from the holder, the slides having characters on the front sides thereof and being shiftable in the holder to enable either slide to overlap the front side of the other slide, the front wall of the holder having an opening between the ends of the holder to expose a character of either slide, the back wall having a longitudinal slot, and the opposite ends of said slides having portions projecting through said slot for sliding and shifting the slides by hand.

3. A changeable sign comprising a holder having a front wall, a top, a bottom and flanges projecting toward one another from said top and bottom, and two slides in said holder and each of shorter length than the holder to enable the adjacent ends of the slides to be moved past one another without withdrawing the slides from the holder, the slides having characters on their front sides and being shiftable between the front wall and flanges of the holder to enable either slide to overlap the front side of the other slide, the front wall of the holder having an opening between the ends of the holder to expose a character of either slide, and said slides having finger pieces at their opposite ends projecting between said flanges for sliding and shifting the slides by hand.

In testimony whereof I hereunto affix my signature.

HARRY H. EARLY.